(12) United States Patent
Frey, Jr.

(10) Patent No.: US 8,146,401 B2
(45) Date of Patent: Apr. 3, 2012

(54) METHOD AND APPARATUS FOR IN-FLIGHT CALIBRATION OF GYROSCOPE USING MAGNETOMETER REFERENCE

(75) Inventor: Robert D. Frey, Jr., Bolton, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 838 days.

(21) Appl. No.: 12/211,923

(22) Filed: Sep. 17, 2008

(65) Prior Publication Data

US 2011/0167893 A1 Jul. 14, 2011

(51) Int. Cl.
*G01C 17/38* (2006.01)
(52) U.S. Cl. .................. 73/1.77; 33/323; 73/503.3
(58) Field of Classification Search .............. 73/1.77, 73/503.3; 33/323
See application file for complete search history.

(56) References Cited

U.S. PATENT DOCUMENTS

| | | | |
|---|---|---|---|
| 4,600,166 A | 7/1986 | Califano et al. | |
| 5,076,694 A | 12/1991 | Aronowitz | |
| 5,654,906 A | 8/1997 | Youngquist | |
| 6,266,585 B1 | 7/2001 | Mazzini | |
| 6,315,062 B1 * | 11/2001 | Alft et al. ................ | 175/45 |
| 6,354,132 B1 | 3/2002 | Van Heyningen | |
| 6,484,818 B2 * | 11/2002 | Alft et al. ................ | 175/45 |
| 6,719,069 B2 * | 4/2004 | Alft et al. ................ | 175/24 |
| 6,823,602 B2 * | 11/2004 | Noureldin et al. .......... | 33/304 |
| 7,103,477 B1 | 9/2006 | Lee | |
| 7,143,844 B2 * | 12/2006 | Alft et al. ................ | 175/45 |
| 7,506,696 B2 * | 3/2009 | Weston et al. ............. | 175/45 |
| 7,607,494 B2 * | 10/2009 | Alft et al. ................ | 175/45 |
| 2008/0156485 A1 * | 7/2008 | Phillips et al. ............ | 166/254.2 |

* cited by examiner

*Primary Examiner* — Hezron E Williams
*Assistant Examiner* — Rodney T Frank
(74) *Attorney, Agent, or Firm* — Daniel J. Long; Hayes Soloway P.C.; Todd A. Sullivan

(57) ABSTRACT

The system includes a mobile vessel having a body axis and a steering mechanism. A three-axis gyroscope is mounted within the vessel. A three-axis magnetometer is mounted within the vessel. A programmable device communicates with the three-axis gyroscope, the three-axis magnetometer, and the steering mechanism. The three-axis gyroscope may include three single axis gyroscopes.

20 Claims, 3 Drawing Sheets

METHOD AND APPARATUS FOR IN-FLIGHT CALIBRATION OF GYROSCOPE USING MAGNETOMETER REFERENCE

STATEMENT OF GOVERNMENT INTEREST

The invention was made with United States Government support under Contract No. HR0011-05-C-0577. The United States Government has certain rights in this invention.

FIELD OF THE INVENTION

The present invention is generally related to guidance systems, and more particularly, is related to a method and apparatus for in-flight calibration of gyroscope using magnetometer reference.

BACKGROUND OF THE INVENTION

Munitions guidance is typically implemented with proportional navigation. Assuming that both the target and guided system are moving in straight lines with constant velocity, the two systems will collide if the angle between the guided system velocity vector and the vector pointing to the target remains constant with time. Of course, neither the target nor the guided system remains at a constant velocity or direction. This is why the guidance solution is a closed loop control with continuous updates to impact.

Munitions generally derive the majority of their lift from the angle of attack of the body. The canards or wings on munitions generate the force that rotates the munitions about its center of gravity (CG) in opposition to the restoring force of the tail in order to generate angle of attack. The wings are generally too small to generate significant lift themselves. It is the angle of attack of the body that generates the majority of the maneuver acceleration. A small munitions with little surface area must generate large angles of attack in order to maneuver.

In a strap down seeker, the vector projection of the boresight is not coincident with the vector direction of travel due to the angle of attack required for maneuver. A round traveling at ~150 m/sec with a miss distance of 100 meters at a range of 1000 meters will have a line of sight rate on the order of 0.002 degree/second given a 20 Hz sample rate on the target location. Precise sensing of the body motion is required in order to eliminate the dominant component of body motion, which is perhaps three orders of magnitude greater in the sensed target line of sight rates.

Gyroscopes area key expense in precision-guided weapons. Devices meeting the scale factor and bias requirements of typical guidance systems cost thousands of dollars. Less expensive devices are known in the industry, but these devices have temperature sensitive scale factor and bias. In addition, the bias has been shown to be unpredictable over time and testing has shown the biases to be sensitive to shock associated with the launch of precision-guided weapons.

Thus, a heretofore unaddressed need exists in the industry to provide a relatively inexpensive gyroscope capable of reliable performance on precision guided weapons.

SUMMARY OF THE INVENTION

Embodiments of the present invention provide a system and method for calibrating a gyroscope in motion aboard a mobile vessel. Briefly described, in architecture, one embodiment of the system, among others, can be implemented as follows. The system includes a mobile vessel having a body axis and a steering mechanism. A three-axis gyroscope is mounted within the vessel. A three-axis magnetometer is mounted within the vessel. A seeker is mounted within the vessel. A programmable device communicates with the three-axis gyroscope, the three-axis magnetometer, the seeker, and the steering mechanism.

The present invention can also be viewed as providing methods for calibrating a gyroscope in motion. In this regard, one embodiment of such a method, among others, can be broadly summarized by the following steps: launching a mobile vessel having a body axis; calibrating a three-axis gyroscope mounted within the mobile vessel using a three-axis magnetometer and a programmable device mounted within the vessel; and altering a direction of the mobile vessel using a steering mechanism based on transformations measured by the gyroscope.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
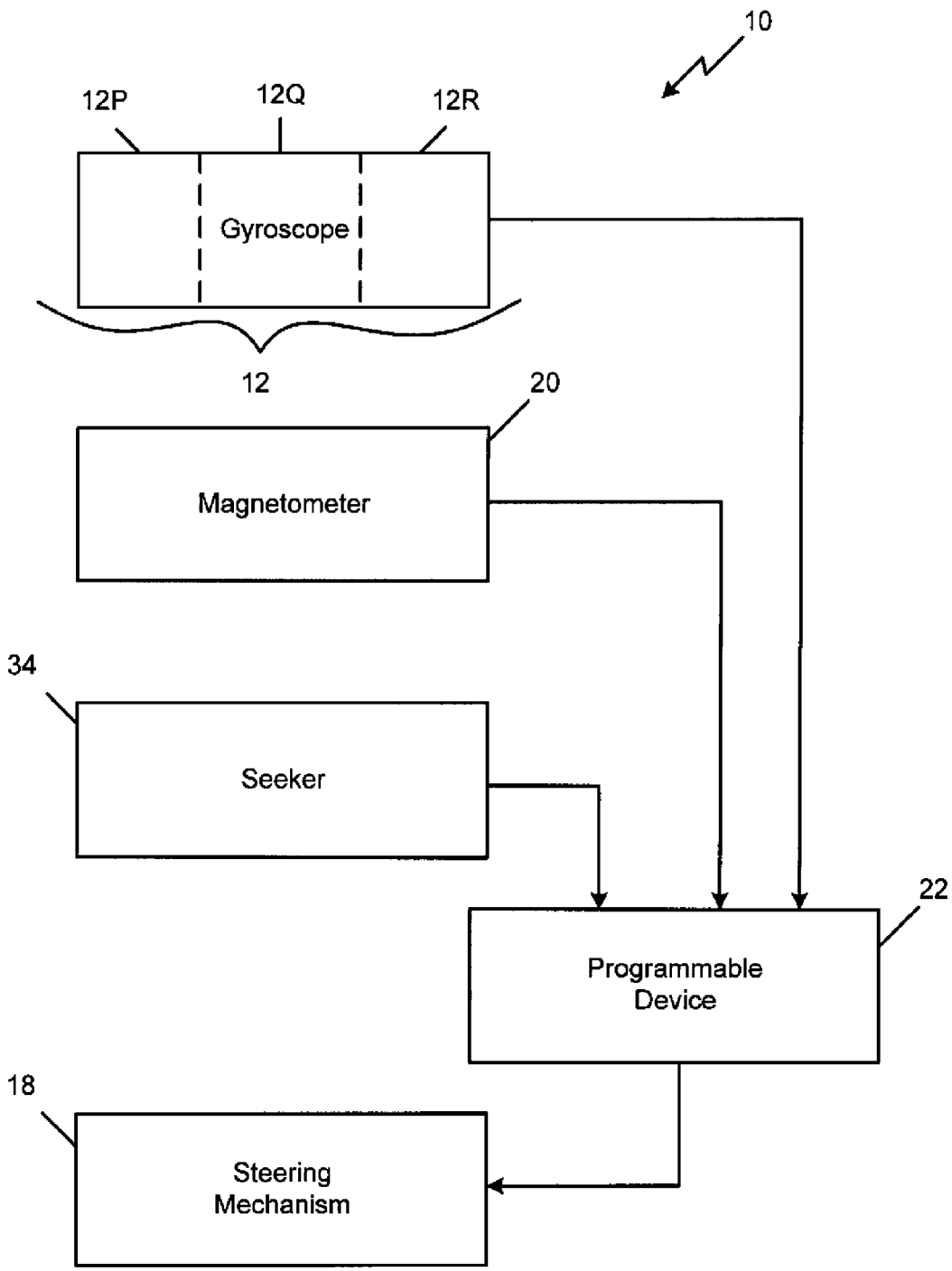
FIG. 1 is an illustration of a block diagram of a system for calibrating a gyroscope, in accordance with a first exemplary embodiment of the present invention.
Figure 2:
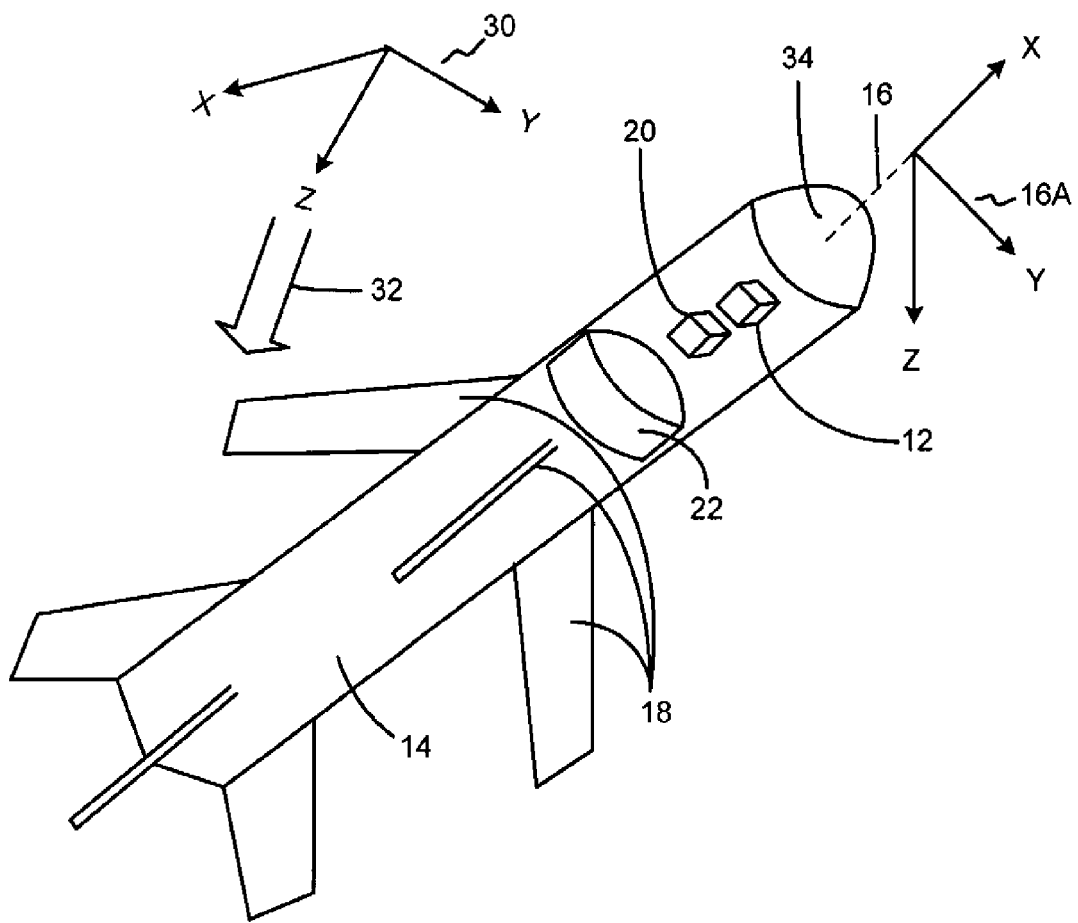
FIG. 2 is a schematic diagram illustrating a cross-sectional view of projectile, in accordance with the first exemplary embodiment of the present invention.

FIG. 1 is an illustration of a block diagram of a system 10 for calibrating a gyroscope 12, in accordance with a first exemplary embodiment of the present invention. FIG. 2 is a schematic diagram illustrating a cross-sectional view of projectile, in accordance with the first exemplary embodiment of the present invention. The system 10 includes a mobile vessel 14 having a body axis 16 and a steering mechanism 18. A three-axis gyroscope 12 is mounted within the vessel 14. A three-axis magnetometer 20 is mounted within the vessel 14 at a known relative orientation to the gyroscope. A seeker 34 is mounted to the vessel at a known orientation relative to the gyroscope. A programmable device 22 communicates with the three-axis gyroscope 12, the three-axis magnetometer 20, seeker 34, and the steering mechanism 18.

The mobile vessel 14 is initially conceived to be an airborne projectile, more specifically, a missile. The mobile vessel 14 may also be a torpedo or other water-based projectile. These mobile vessels 14 may suffer from significant G-forces at launch that would necessitate recalibration of inexpensive gyroscopes. Other mobile vessels that could make use of this calibration system 10 may include unmanned air, land, or water-based vehicles, although presently these types of vessels use more expensive gyroscopes that are resistant to calibration disturbances. The body axis 16 generally runs back-to-front (or front-to-back) along the mobile vessel 14.

The steering mechanism 18 will vary with the selection of a mobile vessel 14. Airborne projectiles generally utilize movable fins to provide steering capability. However, the steering mechanism 18 could be any device capable of influencing the direction of the mobile vessel 14.

The seeker 34 is used to sense the target and is generally placed to provide a forward view. The seeker 34 may consist of a simple sensor that determines direction based on a laser designation, the seeker 34 can be radar-based or it can use an imaging system to detect and track the target. The programmable device 22 uses angle measurements from the seeker 34 in combination with precise measurements of body rates from the gyroscopes 12 to generate commands to the steering mechanism 18 in order to intercept the target. Seekers are known to those having ordinary skill in the art and all seekers known in the art are considered to be within the scope of the present invention.

The in-flight calibration disclosed herein allows the use of inexpensive gyroscopes 12 for guidance applications. The system 10 calibrates the gyroscopes 12 in flight using magnetometers 20 as a truth reference. Magnetometer 20 measurements by themselves cannot uniquely determine a transformation from one Cartesian system to another for direct application in the guidance solution. However the magnetometer 20 measurements can be uniquely related to the gyroscope 12 measurements. The magnetometer 20 can then be used as a reference to calibrate gyroscopes 12, which are then used to measure the transformations required for the guidance solution.

In order to describe the calibration approach, two Cartesian coordinate systems are defined. One Cartesian coordinate system is assumed to be a fixed inertial-referenced system 30 substantially invariant over at least the geographic range of the munitions. This inertial-referenced system is defined as fixed in inertial space with its z-axis aligned to the earth's local magnetic vector 32. The second Cartesian coordinate system is defined in a body-referenced coordinate system 16A with the x-axis aligning with the body axis 16 directed out the nose of the mobile vessel 14, the y-axis out the left side of the mobile vessel 14, and the z-axis out of the bottom of the mobile vessel 14. These reference systems are not limiting, other reference systems may be applied with appropriate conversions in mathematical derivation relating the body fixed and inertial fixed reference systems. The body-referenced coordinate system 16A varies with respect to the fixed inertial-referenced system over time as the munitions maneuvers. A vector can be transformed from inertial-referenced space to the body-reference space using a direction cosine matrix as defined in Equation 1.

$$T^{B1} = \begin{bmatrix} \cos\psi\cos\theta & \sin\psi\cos\theta & -\sin\theta \\ \cos\psi\sin\theta\sin\phi - \sin\psi\cos\phi & \sin\psi\sin\theta\sin\phi - \cos\psi\cos\phi & \cos\theta\sin\phi \\ \cos\psi\sin\theta\cos\phi + \sin\psi\sin\phi & \sin\psi\sin\theta\cos\phi - \cos\psi\sin\phi & \cos\theta\cos\phi \end{bmatrix} \quad (1)$$

$\theta$ = pitch $\psi$ = yaw $\phi$ = roll

The guided munition carries a three-axis gyroscope 12 preferably mounted to measure the rotation about the body-referenced x-, y- and z-axis. The gyroscope 12 can be mounted in any orientation relative to the body-reference coordinate system 16A. In this case the rotations p-q-r are referenced to a gyroscope local coordinate system. The rotation about the x-axis is measured as an angular rate p, the rotation about the y-axis is measured as an angular rate q and the rotation about z-axis is measured as an angular rate r. The three-axis gyroscope 12 may be formed by three single axis gyroscopes: a p gyroscope 12P that measures angular rate p; a q gyroscope 12Q that measures angular rate q; and an r gyroscope 12R that measures angular rate r. Each single axis gyroscope 12P, 12Q, 12R of the three-axis gyroscope 12 may be mounted at any known angle relative to the body axis 16, preferably such that the three gyroscope axes are orthogonal to each other. The body angular rates and the Euler angle rates are related as defined by Equation 2.

$$\begin{bmatrix} \dot\phi \\ \dot\theta \\ \dot\psi \end{bmatrix} = \begin{bmatrix} 1.0 & \sin\phi\tan\theta & \cos\phi\tan\theta \\ 0.0 & \cos\phi & -\sin\phi \\ 0.0 & \frac{\sin\phi}{\cos\theta} & \frac{\cos\phi}{\cos\theta} \end{bmatrix} \begin{bmatrix} p \\ q \\ r \end{bmatrix} \quad (2)$$

The guided munitions also carries a three-axis magnetometer 20 that measures the earth's field 32 in the body-referenced coordinate system 16A. Given the definition of the inertial-referenced system 30, the field as measured in the body-referenced coordinate system 16A may be determined from Equation 1.

$$\vec{H}^B = T^{B1}\vec{H}^1 \quad (3)$$

$\vec{H}^1$ = inertially referenced magnetic field.

$\vec{H}^B$ = body referenced magnetic field.

Given the definition of the fixed inertial-reference system, the inertial-referenced magnetic vector may be defined as:

$$\vec{H}^I = \begin{bmatrix} 0 \\ 0 \\ 1 \end{bmatrix} H_E \quad (4)$$

$H_E$ = local earth field magnitude

Using Equations 2 and 4, the body-referenced magnetic vector as measured by the on-board magnetometers 20 may therefore be:

$$\vec{H}^B = \begin{bmatrix} -\sin\theta \\ \cos\theta\sin\phi \\ \cos\theta\cos\phi \end{bmatrix} H_E = \begin{bmatrix} H_x^B \\ H_y^B \\ H_z^B \end{bmatrix} \quad (5)$$

The roll ($\phi$) and pitch ($\theta$) may be solved based on the magnetometer 20 measurements per Equation 5.

$$\theta = \arcsin\left(-\frac{H_x^B}{H_E}\right) \quad (6)$$

$$\phi = \arcsin\left(\frac{H_y^B}{H_z^B}\right) \quad (7)$$

$$H_E = \sqrt{(H_x^B)^2 + (H_y^B)^2 + (H_z^B)^2} \quad (8)$$

The gyroscope 12 measurements can be related to the true body rates with their unknown scale and bias terms as:

$$p = s_p p_{gyro} + b_p \quad (9)$$

$$q = s_q q_{gyro} + b_q \quad (10)$$

$$r = s_r r_{gyro} + b_r \quad (11)$$

Applying Equations 9 through 11 to the first two rows of equation 2:

$$\dot{\phi} = s_p p_{gyro} + b_p + s_q q_{gyro} \sin\phi \tan\theta + b_q \sin\phi \tan\theta + s_r r_{gyro} \cos\phi \tan\theta + b_r \cos\phi \tan\theta \quad (12)$$

$$\dot{\theta} = s_q q_{gyro} \cos\phi + b_q \cos\phi - s_r r_{gyro} \sin\phi - b_r \sin\phi \quad (13)$$

Equations 12 and 13 form the basis for many possible implementations of estimators, wherein the approach may be dictated in part by the scenario and available timeline. Rapid convergence is achieved by minimizing the unknown "states" in the estimator. As previously noted, inexpensive gyroscopes have predictable and repeatable scale factors that vary with temperature. The gyroscopes generally include a temperature sensor to support the calibration over temperature. With the calibration of the scale factor, the equations can be rewritten as:

$$\begin{bmatrix} \dot{\phi} \\ \dot{\theta} \end{bmatrix} - \begin{bmatrix} 1 & \sin\phi\tan\theta & \cos\phi\tan\theta \\ 0 & \cos\phi & -\sin\phi \end{bmatrix} \quad (14)$$

$$\begin{bmatrix} p_{gyro} \\ q_{gyro} \\ r_{gyro} \end{bmatrix} = \begin{bmatrix} 1 & \sin\phi\tan\theta & \cos\phi\tan\theta \\ 0 & \cos\phi & -\sin\phi \end{bmatrix} \begin{bmatrix} b_p \\ b_q \\ b_r \end{bmatrix}$$

In a Kalman estimator, this equation relates the state estimate to the measurement. The innovation is calculated as:

$$\tilde{y}_k = z_k - H_k \hat{x}_{k|k-1} \quad (15)$$

with:

$$H_k = \begin{bmatrix} 1 & \sin\phi\tan\theta & \cos\phi\tan\theta \\ 0 & \cos\phi & -\sin\phi \end{bmatrix} \quad (16)$$

$$x_k = \begin{bmatrix} b_p \\ b_q \\ b_r \end{bmatrix} \quad (17)$$

$$z_k = \begin{bmatrix} \dot{\phi} \\ \dot{\theta} \end{bmatrix} - H_k \begin{bmatrix} M_p \\ M_q \\ M_r \end{bmatrix} \quad (18)$$

The state prediction is $$\hat{x}_{k|k-1} = F_k \hat{x}_{k-1|k-1} + B_k u_{k-1} \quad (19)$$

with F set to an identity matrix and B set to zero. Alternatively, for rapid varying bias, the state transition model, F, can be modified to track time-varying change in bias and the B matrix can be set to model temperature sensitivities using temperature as an input.

An alternative approach to minimization of unknown states may be used when supported by timeline. For instance a ballistic projectiles seeker cannot observe the target for guidance until post apogee. In this case, during the ascent prior to apogee, the vehicle can be maneuvered into orientations that isolate states and perform dedicated maneuvers to support scale factor calibration. Another key advantage is that the individual estimators are less sensitive to misalignment between the gyroscopes and magnetometers, allowing additional flexibility in system design.

The munition has the capability of rolling to orient the magnetic field relative to the y and z-axis and therefore controlling the roll angle, $\phi$. Rolling the munitions to set $\phi$ to ninety degrees, Equation 13 may become:

$$-\dot{\theta} = s_r r_{gyro} + b_r \quad (20)$$

In order to support scale factor calibration, the munition can perform a controlled body referenced yaw maneuver in order to measure the r gyroscope 12R scale factor and bias. In this orientation, the yaw maneuver generates a disturbance on the r gyroscope 12R while maintaining near zero disturbance on the q gyroscope 12Q. The roll orientation is maintained such that cos $\phi$ is near zero. The measurement of $\dot{\theta}$ is made using magnetometer measurements through Equation 6 and calculating the difference divided by the sample time. The scale factor and bias is computed using an estimator based on Equation 20, gyroscope 12 measurements, and the rates derived from the magnetometer 20.

The system 10 next orients $\phi$ to zero in order to null the measurement from the r gyroscope 12R. In this orientation, Equation 12 can be approximated as:

$$\dot{\phi} = s_p p_{gyro} + b_p + r \tan\theta \quad (21)$$

The r gyroscope 12R bias and scale factor has been previously calibrated so a corrected measurement of the r body rate is available for the calibration of the p gyroscope 12P. The system 10 performs a maneuver with the vessel 14 about the roll axis in order to calibrate the p gyroscope 12P scale and bias using an estimator based on Equation 21.

Also, in this orientation, Equation 13 can be approximated as:

$$\dot{\theta} = s_q q_{gyro} + b_q \quad (22)$$

The vessel 14 next executes a body-referenced pitch maneuver to support the calibration of the bias and scale factor of the q gyroscope 12Q using an estimator based on Equation 22.

The mobile vessel 14 may include a significant ferrous body encompassing an explosive. The ferrous material carries a system dependent magnetic field. The location of the magnetometer 20 may be forward of the ferrous body and close to the body axis 16. The lines of flux at this location are primarily coincident with, the x-axis of the mobile vessel 14. The ferrous body may also be subjected to high levels of shock, for example, that may cause a change in the magnetic characteristics of the ferrous body. Given that the bias subsequent to launch is unknown, the system may use knowledge of the local earth magnetic field or incorporate an estimator to determine the magnetic bias due to the body. Following launch, the bias introduced by the body can be determined from knowledge of the total field amplitude and the measurements made by the on-board magnetometer 20.

The gyroscope 12 may include three single axis gyroscopes 12P, 12Q, 12R mounted independently in the mobile vessel 14 and separated from the magnetometer 20. This arrangement may impede potential calibration accuracy due to tolerance build up between the magnetometers and the gyroscopes. One preferred implementation would place these devices within close proximity to each other. Performance improvements and simplification in the calibration approach may be achieved if the single axis gyroscopes 12P, 12Q, 12R and the magnetometer 20 can be mounted in closer proximity in order to maintain orthogonal and known angular relationships relative to each other, for instance mounted on a common stiff structure. In order to counter issues related to the location tolerancing, the system 10 may calibrate each axis individually, as previously described.

The programmable device 22 may be arranged to receive at least one output from the three-axis gyroscope 12 and at least one output from the three-axis magnetometer 20 and transmit at least one signal to the steering mechanism 18. More specifically, the programmable device 22 may receive data from the gyroscope 12 and the magnetometer 20 and perform the calculations discussed herein. Further, the programmable device 22 may track a position and/or vector of a target and control the steering mechanism 18 to cause the mobile vessel 14 to adopt or maintain an intercept course. In this regard, operating a steering mechanism 18 with a programmable device 22 based on data from a calibrated gyroscope 12 is known to one of ordinary skill in the art and, for this reason, is not discussed further.

Figure 3:
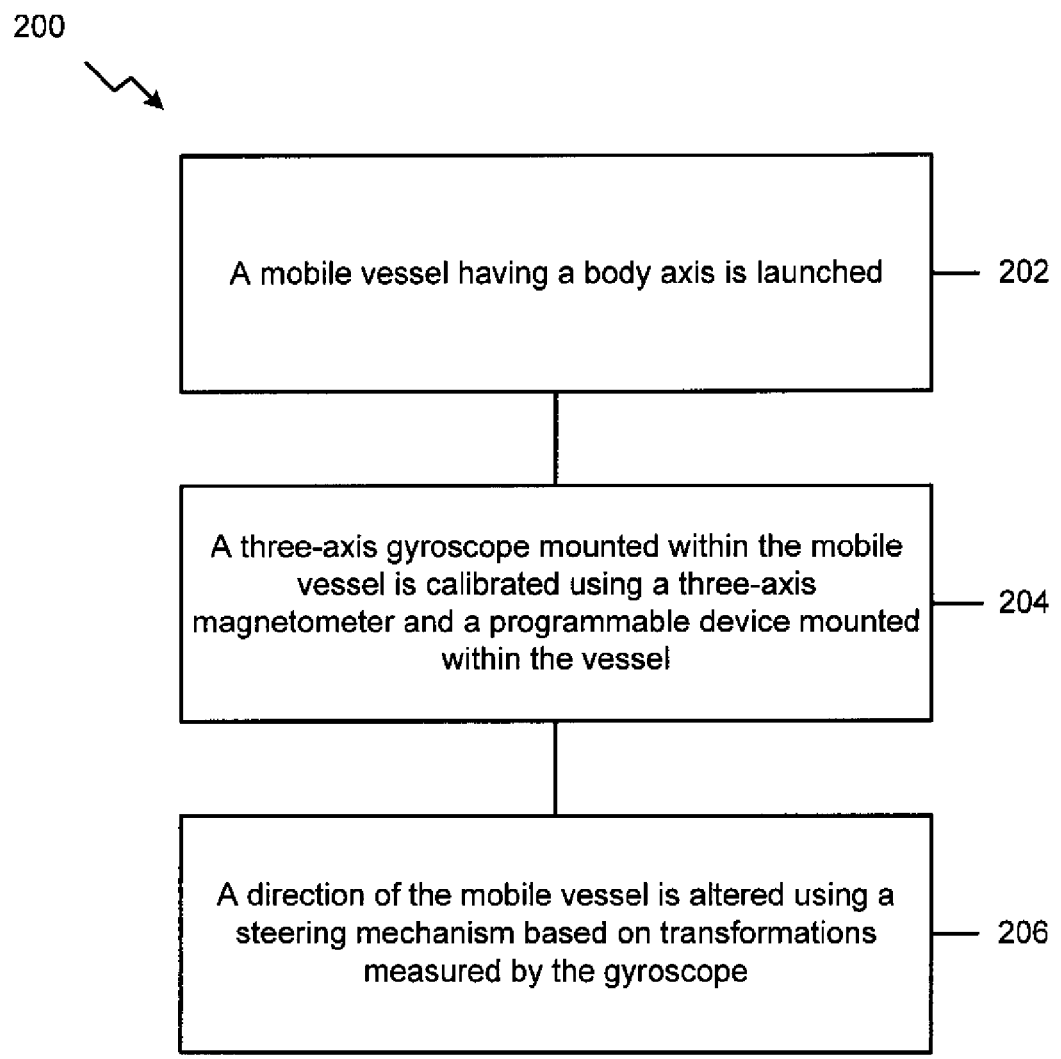
FIG. 3 is a flowchart illustrating a method of calibrating a gyroscope in a mobile vessel, in accordance with the first exemplary embodiment of the invention.

FIG. 3 is a flowchart 200 illustrating a method of calibrating a gyroscope in a mobile, vessel, in accordance with the first exemplary embodiment, of the invention. It should be noted that any process descriptions or blocks in flow charts should be understood as representing modules, segments, portions of code, or steps that include one or more instructions for implementing specific logical functions in the process, and alternate implementations are included within the scope of the present invention in which functions may be executed out of order from that shown or discussed, including substantially concurrently or in reverse order, depending on the functionality involved, as would be understood by those reasonably skilled in the art of the present invention.

As is shown by block 202, a mobile vessel 14 having a body axis 16 is launched. A three-axis gyroscope 12 mounted within the mobile vessel 14 is calibrated using a three-axis magnetometer 20 and a programmable device 22 mounted within the vessel (block 204). A direction of the mobile vessel 14 is altered using a steering mechanism 18 based on transformations measured by the gyroscope 12 (block 206).

The method of calibrating the gyroscope 12 may also include altering a direction of the mobile vessel 14 to calibrate at least one axis of the gyroscope 12. Each axis of the gyroscope 12 may be calibrated with a single maneuver, such that calibrating all three axes may require three maneuvers. These maneuvers may require five seconds or more. Guided munitions fired from, mortars may have an ascent of approximately five seconds and a decent of approximately five seconds. The significant G-forces of this type of guided munitions are realized immediately. Thereafter, the mobile vessel 14 may perform maneuvers on ascent such that it is calibrated approximately at the time descent begins, which may also be when steering is most critical. The calibration time and the flight time of this particular vessel 14 limit the gyroscope 12 to a single in-flight calibration.

It should be emphasized that the above-described embodiments of the present invention, particularly, any "preferred" embodiments, are merely possible examples of implementations, merely set forth for a clear understanding of the principles of the invention. Many variations, and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A calibration system, comprising:
    a mobile vessel having a body axis and a steering mechanism;
    a three-axis gyroscope mounted within the vessel;
    a three-axis magnetometer mounted within the vessel; and
    a programmable device in communication with the three-axis gyroscope, the three-axis magnetometer, and the steering mechanism, wherein the three-axis gyroscope receives a calibration reference signal from the magnetometer while the mobile vessel is in flight.

2. The calibration system of claim 1, wherein the three-axis gyroscope further comprises three single axis gyroscopes mounted independently within the mobile vessel.

3. The calibration system of claim 1, further comprising a seeker mounted within the vessel in communication with the programmable device.

4. The calibration system of claim 1, wherein each axis of the three-axis gyroscope is mounted substantially orthogonal relative to the other axes of the three-axis gyroscope.

5. The calibration system of claim 1, wherein each axis of the three-axis magnetometer is mounted at a known angle relative to the three-axis gyroscope.

6. A calibration system comprising,
    a projectile having a body axis and a steering mechanism;
    a three-axis gyroscope mounted within the projectile;
    a three-axis magnetometer mounted within the projectile; and
    a programmable device in communication with the three-axis gyroscope, the three-axis magnetometer, and the steering mechanism.

7. The calibration system of claim 6, further comprising a seeker mounted within the projectile in communication with the programmable device.

8. The calibration system of claim 6, wherein each axis of the three-axis magnetometer is mounted at a known angle relative to the three-axis gyroscope.

9. The calibration system of claim 6, wherein the programmable device is arranged to receive at least one output from the three-axis gyroscope and at least one output from the three-axis magnetometer and transmit at least one signal to the steering mechanism.

10. The calibration system of claim 6, further comprising a seeker mounted within the projectile in communication with the programmable device, the seeker mounted at a known orientation relative to the gyroscope.

11. The calibration system of claim 1, wherein the programmable device is arranged to receive at least one output from the three-axis gyroscope and at least one output from the three-axis magnetometer and transmit at least one signal to the steering mechanism.

12. The calibration system of claim 1, further comprising a seeker mounted within the vessel in communication with the programmable device, the seeker mounted at a known orientation relative to the gyroscope.

13. The calibration system of claim 1, wherein the mobile vessel further comprises a water-based vehicle.

14. A method for calibration, the method comprising the steps of:
    launching a mobile vessel having a body axis;
    calibrating a three-axis gyroscope mounted within the mobile vessel at least once during a flight of the mobile vessel using a three-axis magnetometer and a programmable device mounted within the vessel; and altering a direction of the mobile vessel using a steering mechanism based on transformations calculated by the programmable device based on measurements by the gyroscope and a seeker.

15. The method of claim 14, furthering comprising orienting the three-axis magnetometer relative to the earth field.

16. A method for calibration, the method comprising the steps of:

launching a mobile vessel having a body axis into the air;

calibrating a three-axis gyroscope mounted within the mobile vessel using a three-axis magnetometer and a programmable device mounted within the vessel; and altering a direction of the mobile vessel using a steering mechanism based on transformations calculated by the programmable device based on measurements by the gyroscope and a seeker.

17. The method of claim 14, further comprising calibrating the three-axis gyroscope using an estimator.

18. The method of claim 14, wherein the step of calibrating further comprises calibrating the three-axis gyroscope in less than six seconds.

19. The method of claim 14, wherein the step of calibrating further comprises calibrating the three-axis gyroscope in less than two seconds.

20. The method of claim 14, further comprising altering a direction of the mobile vessel using a steering mechanism to generate data for calibrating at least one axis of the gyroscope.

* * * * *